United States Patent [19]

Sakurai

[11] Patent Number: 5,212,682
[45] Date of Patent: May 18, 1993

[54] WRITE-ONE TYPE RECORDING MEDIUM STORING TIME AND DATA-WRITING MANAGEMENT DATA AND RECORDING APPARATUS THEREOF

[75] Inventor: Yukimitsu Sakurai, Yokohama, Japan

[73] Assignee: Victor Company of Japan, Ltd., Yokohama, Japan

[21] Appl. No.: 633,978

[22] Filed: Dec. 26, 1990

[30] Foreign Application Priority Data

Dec. 27, 1989 [JP] Japan .................................. 1-341338

[51] Int. Cl.$^5$ .......................... G11B 3/70; G11B 5/84; G11B 7/26
[52] U.S. Cl. ................................ 369/275.3; 369/278; 369/279
[58] Field of Search ...................... 369/275.3, 277, 278, 369/279

[56] References Cited

U.S. PATENT DOCUMENTS

| | | | |
|---|---|---|---|
| 4,094,013 | 6/1978 | Hill et al. ............................ | 369/278 |
| 4,787,075 | 11/1988 | Matsuoka et al. ................... | 369/279 |
| 4,789,979 | 12/1988 | Hiraoka et al. ..................... | 369/279 |
| 4,796,250 | 1/1989 | Kobayashi et al. .................. | 369/278 |
| 4,858,221 | 8/1989 | Roméas ................................ | 369/279 |
| 4,949,331 | 8/1990 | Maeda et al. ........................ | 369/277 |
| 4,967,403 | 10/1990 | Ogawa et al. ...................... | 369/275.3 |
| 5,056,076 | 10/1991 | Tsuji et al. ............................ | 369/277 |
| 5,091,635 | 2/1992 | Akatsuka et al. ................. | 369/275.3 |

Primary Examiner—Eugene R. LaRoche
Assistant Examiner—Michael Kessell
Attorney, Agent, or Firm—Michael N. Meller

[57] ABSTRACT

A write once-type recording medium with a guide groove has a first management data for constantly managing a position of a track in the groove after data-writing/reading is excuted and a second management data for managing the data-writing, both optically recorded on a position in the groove displaced from that position. A recording apparatus has a reproducing device reproducing by tracking control a management data of track-position management data whose specific portions replaced with data-writing management data, a comparator having reference data equal to the track-position management data comparing the management data with the reference data, a controller outputting the management data as the track-position management data if both equal to each other, and judging if the management data corresponding to the specific portion if not equal, then outputting the management data as the data-writing management data if there is correspondence and excuting error correction if no correspondence meaning an error generated in the management data and a managing device managing the tracking control with the outputted track-position management data and data-writing with the outputted data-writing management data.

3 Claims, 4 Drawing Sheets

| SYNC | MINUTE | SECOND | FRAME NO. | ERROR CORRECTING CODE |
|---|---|---|---|---|

FIG. 1

|  | TIME-CODE | | |
|---|---|---|---|
| (POSITION) | MINUTE | SECOND | FRAME |
| 00' 00" 00F | 0 | 0 | 0 |
| 00' 00" 01F | 0 | 0 | 1 |
| 00' 00" 02F | 0 | 0 | 2 |
| 00' 00" 03F | 0 | 0 | 3 |
| . . . . . . . . . | | | |
| . . . | | | |
| 12' 14" 73F | 12 | 14 | 73 |
| 12' 14" 74F | 12 | 14 | 74 |
| 12' 15" 00F | 12 | 15 | 0 |
| 12' 15" 01F | 12 | 15 | 1 |
| 12' 15" 02F | 12 | 15 | 2 |
| . . . . . . | | | |
| 63' 59" 74F | 63 | 59 | 74 |

FIG. 2 PRIOR ART

|  | MANAGEMENT DATA | | |
|---|---|---|---|
| (POSITION) | MINUTE | SECOND | FRAME |
| 00' 00" 00F | 45 | 10 | 0 |
| 00' 00" 01F | 0 | 0 | 1 |
| 00' 00" 02F | 0 | 0 | 2 |
| 00' 00" 03F | 0 | 0 | 3 |
| ............ | | | |
| ... | | | |
| 12' 14" 73F | 12 | 14 | 73 |
| 12' 14" 74F | 12 | 14 | 74 |
| 12' 15" 00F | 45 | 10 | 0 |
| 12' 15" 01F | 12 | 15 | 1 |
| 12' 15" 02F | 12 | 15 | 2 |
| ....... | | | |
| 63' 59" 74F | 63 | 59 | 74 |

FIG. 3

|  | MANAGEMENT DATA | | |
|---|---|---|---|
| (POSITION) | MINUTE | SECOND | FRAME |
| 00' 00" 00F | 5 | 0 | 0 |
| 00' 00" 01F | 0 | 0 | 1 |
| 00' 00" 02F | 0 | 0 | 2 |
| 00' 00" 03F | 0 | 0 | 3 |
| ............ | | | |
| ... | | | |
| 12' 14" 73F | 12 | 14 | 73 |
| 12' 14" 74F | 12 | 14 | 74 |
| 12' 15" 00F | 5 | 0 | 0 |
| 12' 15" 01F | 12 | 15 | 1 |
| 12' 15" 02F | 12 | 15 | 2 |
| ...... | | | |
| 63' 59" 74F | 63 | 59 | 74 |

FIG. 4

```
00' 00" 00F                    45' 10" 00F
├─────────────────────────────────┼──────────────────────────┤
      READ ONLY FIELD              BORDER    WRITE ONCE FIELD
```

| PARAMETER | LASER OUTPUT FOR DATA-WRITING |
|-----------|-------------------------------|
| 0 0       | 5  (mW)                       |
| 0 1       | 1 0                           |
| 0 2       | 1 5                           |
| 0 3       | 2 0                           |
| 0 4       | 2 5                           |
| 0 5       | 3 0                           |
| 0 6       | 3 5                           |
| 0 7       | 4 0                           |

WRITE-ONE TYPE RECORDING MEDIUM STORING TIME AND DATA-WRITING MANAGEMENT DATA AND RECORDING APPARATUS THEREOF

BACKGROUND OF THE INVENTION

The present invention relates to a write once-type recording medium and a recording apparatus thereof.

In recent years, as for a recording medium, a write once-type optical disc has attracted users' attention and a lot of writable materials have been developed. The write once-type optical disc usually has a pre-groove (guide groove) for guiding the light beam used for writing or reading.

The CD-WO (compact disc for write once use) proposed by PHILIPS CO. has the pre-groove which is wobbled by a wobbling signal for obtaining the precise tracking control signal of the light beam. As the result of wobbling, the pre-groove is displaced on both sides of the regular position of the track in accordance with the wobbling signal.

According to the proposed standard, the CD-WO is provided with the pre-groove which is recorded with time-codes in the format as shown in FIG. 1.

Each time-code comprises codes designating a synchronizing signal(SYNC), minute, second, frame number and an error-correcting code, successively and are superimposed on the wobbling signal.

In the CD-WO, its recording area is divided in many tiny segments called a frame and 75 frames correspond to the period of 1 second. For indicating or managing the absolute position of these frames, each frame has a peculiar time code, For example, the time code of the first frame on a disc is "00 00 00" (=00 minute, 00 second and 00th frame) and that of the next frame is "00 00 01" and so on.

The time-codes so recorded are obtained by demodulating the tracking control signal which is obtained from a reflected light of such as a data writing-light, data reading-light and tracking light. The time-codes obtained as above are then used for data-writing/reading.

FIG. 2 shows an example of correspondence between the position on a write once-type optical disc and time-codes. On the position "12' 14" 73F ", for example, the time - code "12 minutes, 14 seconds and 73rd frame" is recorded.

As described before, there are many materials for write once use and therefore it is desirable that the writing characteristics of the disc are recorded previously for setting writing parameters.

A write once-type optical disc capable of storing large amount of data is classified into such disc types as a partial write once-type and full write once-type.

The former has a read only field formed on the inner peripheral portion of the disc, the field recorded with data with protection prior to use and a write-once field formed on the outer peripheral portion of the disc.

The latter has a read only field prerecorded with data and formed on the inner peripheral portion of the disc and a write once field formed on the peripheral portion thereof.

The write once-type disc described as above requires writing-management data for indicating a border between the read only field and write once field, and the writing characteristics.

The writing-management data are not always necessary in the case of data-writing but the time-codes are.

The data of the border is necessary only on the first write once, after that file and directory management, etc., follow.

On the other hand, the data such as the writing output is necessary only on the beginning of every write once. After that, the output is maintained.

Consequently, with respect to the writing-management data, the data must be fed to a recording apparatus on every writing and the write once-type optical disc is limited to the one which meets the data set in a recording apparatus.

This results in the write once-type optical disc being used in limited purposes. Furthermore, if the writing-management data are prerecorded in the data-recording field of the write once-type optical disc, the disc will be incompatible with widely known read only optical discs.

SUMMARY OF THE INVENTION

An object of the present invention is to provide a write once-type recording medium having a guide groove. Track-position management data and data-writing management data peculiar to the write once-type recording medium are superimposed on each other to be a tracking error signal. The signal is then recorded on a position in the guide groove displaced from the position of a track.

A further object of the present invention is to provide a recording apparatus for a write once-type recording medium having a guide groove.

The apparatus comprises reproduction means for reproducing by tracking control a management data composed of track-position management data whose specific portions are replaced with data-writing management data, comparison means provided with reference data equal to the track-position management data for comparing the management data with the reference data, control means for outputting the management data as the track-position management data if both are equal to each other, and judging whether the management data corresponds to the specific portion if not equal, then outputting the management data as the data-writing management data if there is correspondence and excuting error correction if there is no correspondence which means an error being generated in the management data and management means for managing the tracking control with the outputted track-position management data and data-writing with the outputted data-writing management data.

Accordingly, the present invention is advantageous in that the write once-type optical disc becomes more available to different purposes, since data-writing management data (writing parameters) are recorded on the optical disc itself so that there is no need to feed the writing parameters to the recording apparatus and the write., once-type optical disc is not limited to ones which meet the parameters set in the recording apparatus.

Furthermore, the parameters are not prerecorded in the data-recording field of the write once-type optical disc so that it can be compatible with any widely known read only optical discs.

The other objects and features of the present invention will become understood from the following description with reference to the accompany drawings.

BRIEF DESCRIPTION OF THE DRAWINGS

FIG. 1 is a view of a format of time-codes to be recorded:

FIG. 2 is an example of conventional time-codes;

FIGS. 3 and 4 show management data according to the present invention;

FIGS. 8 and 9 show flowcharts excuted by the recording apparatus shown in FIG. 7.

DETAILED DESCRIPTION OF THE PREFERRED EMBODIMENTS

The present invention will now be described in detail with reference to the accompanying drawings.

FIGS. 3 and 4 show management data recorded on a write once-type recording medium, respectively.

The management data recorded in the write once-type recording medium (an optical disc 1 shown in FIG. 7) is composed of time-management data (time-codes) and writing-management data peculiar to each recording medium.

The management data is recorded onto a spiral guide groove formed on the recording medium, as a tracking error signal.

The time-management data is composed of the time-codes, each corresponding to the positions on the recording medium and are regularly increased and changed (by one frame, that is, at a constant time cycle for one frame). The time-codes for one second are composed of 75 frames from 0 to 74th frame.

The writing-management data is composed of the writing parameters which establish the border between the read only field and the write once field and laser output values for data-writing.

Instead of the time-management data, the writing-management data is repeatedly recorded on the positions (time) corresponding to every zero frame (75th frame) and has sufficiently longer time cycle than that of the time-codes at every frame.

More specifically, FIG. 3 shows an example of the writing-management data which includes the writing parameter establishing the border. The management data "45 10 00" recorded on every zero frame on the position such as "00' 00" 00F" shows that the border is located on the position "45' 10" 00F". This means that the recording medium used here is the write once-type optical disc as shown in FIG. 5.

FIG. 4 shows an example of the writing-management data which includes the writing parameter establishing the laser output value for data-writing. The management data "05 00 00" recorded on every zero frame on the position such as "00' 00" 00F" shows that the laser output value parameter is "05". The parameter and an actual laser output value correspond with each other as shown in FIG. 6, wherein "05" means that the laser output value is 30 mw.

Figure 8:
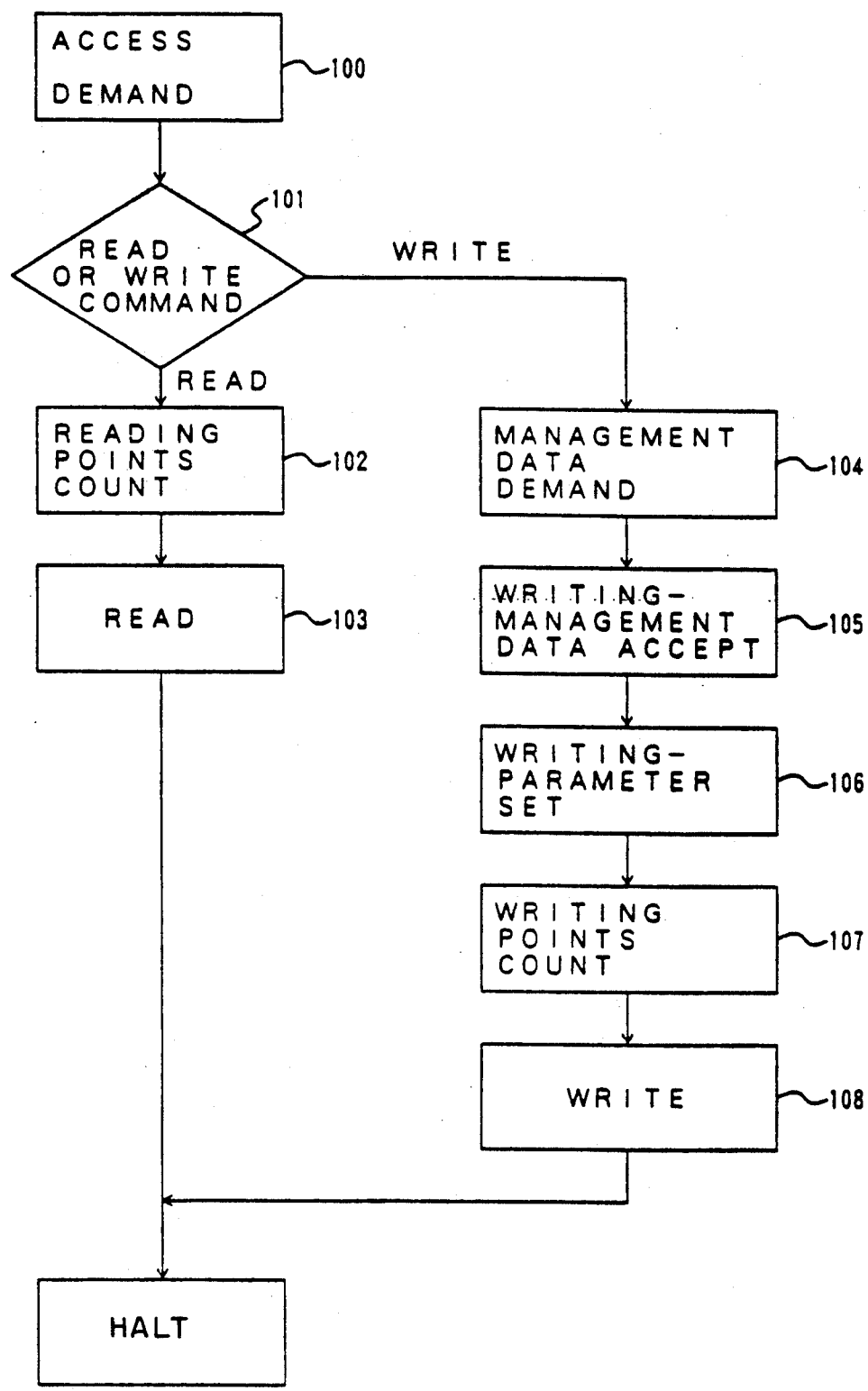

Next, a recording apparatus for the write once-type optical recording medium described as above will be explained with reference to FIG. 7 which shows a block diagram of the recording apparatus. FIGS. 8 and 9 are flowcharts showing operations excuted by the recording apparatus.

Figures 5, 6, 7:
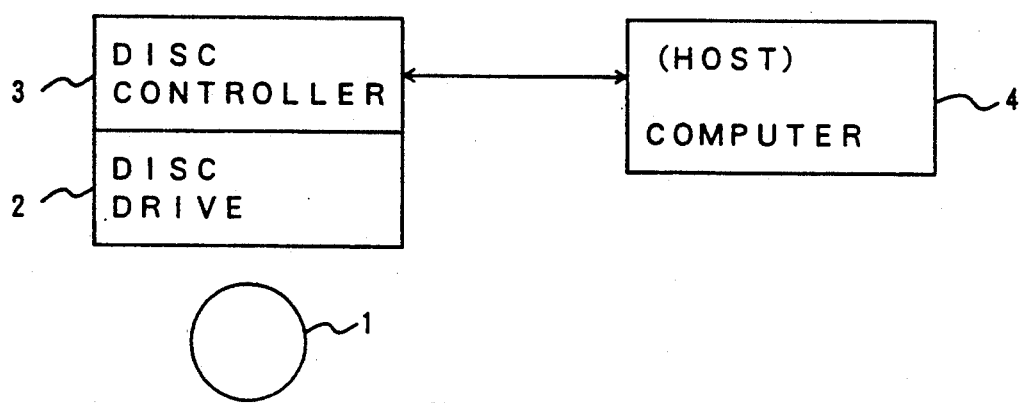
FIG. 5 shows an example of the layout of a write once-type recording medium according to the present invention.
FIG. 6 shows an example of correspondence between laser output values and parameters according to the present invention.
FIG. 7 is a block diagram of a recording apparatus according to the present invention.

In FIG. 7, the recording apparatus is provided with a disc drive 2 in which an optical disc 1 is installed, disc controller 3 provided with a counter (not shown) for counting time-codes and for controlling the disc drive 2 and (host) computer 4 which manages the disc controller 3.

Information including an image, voice and data is recorded on or read out from the disc 1 in a specific format, while the disc controller 3 is tracking controlling the disc 1 on the guide groove thereof.

The computer 4 excutes data-writing/reading according to the flowchart shown in FIG. 8. The disc controller 3 reads the management data from the disc 1 and feeds the data to the computer 4 if necessary.

As shown in FIG. 8, when accepting an access command (STEP 100), the computer 4 judges whether the command is a read or write command (STEP 101). The computer 4 then counts read points from the present frame to examine at which frame data-reading must be executed and executes reading (STEPS 102 and 103) if the access command is the read command.

On the other hand, if the write command, the computer 4 commands the disc controller 3 to feed the management data thereto (STEP 104).

The disc controller 3 begins to read the management data from the disc 1 according to the flowchart shown in FIG. 9. In the flowchart, the disc controller 3 starts tracking control to the disc at the guide groove thereon (STEP 200). The management data is then obtained from the tracking error signal reproduced from the guide groove (STEP 201).

The obtained management data and time-codes counted by the counter (not shown) installed in the disc controller 3 are compared with each other at every frame (STEP 202). For example, the time-codes are counted by 1/75 seconds as shown in FIG. 2.

When both are equal to each other in the STEP 202, the obtained data is set as the time-code (STEP 203). Then, the program returns to the STEP 201.

While, if not equal to each other in the STEP 202, it is examined whether the frame (position) of the counted time-code to which the comparison was made is a specific frame (position) which has been recorded with the writing-management data (STEP 204). In FIGS. 3 and 4, it is examined if the position where the comparison was made is the position corresponding to the zero frame.

If it is the specific frame (position), a value reproduced from the management data is fed to the computer 4 as the writing-management data (STEP 205). Then, the program returns to the STEP 201.

On the other hand if not the specific frame (position), it is recognized as an error which is then corrected (STEP 206). Then, the program returns to the STEP 201.

Again in FIG. 8, the computer 4 accepts the writing-management data (writing parameter) obtained by the disc controller 3 (STEP 105) and then sets the border (start point for writing) and output power of laser, etc., (STEP 106).

The computer 4 then counts writing points from the present frame to examine at which frame data-writing must be excuted (STEPS 107 and 108).

As described above, the write once-type recording medium according to the present invention has much availability, since data-writing management data (writing parameters) are recorded on the recording medium itself so that there is no need to feed the writing parameters to the recording apparatus.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. A recording apparatus for a write once-type recording medium having a guide groove, comprising:

reproduction means for reproducing from said recording medium, by tracking control, management data stored in said guide groove, said management data being composed of a series of track-position management data including frame numbers of said recording medium and data-writing management data, said track-position and data-writing management data being super-imposed on each other such that said track-position management data are replaced with said data-writing management data per specific frame number;

comparison means for comparing, per frame number, said management data with a series of reference track-position management data having the same number of data as the number of management data;

control means which, if data of the track-position management data on a frame number is equal to data of said reference track-position management data on that frame number, for outputting that equal data, and if those compared data are not equal to each other, judging whether that compared data of the track-position management data is data which is replaced with said data-writing management data, then outputting said data-writing management data if that compared data is judged as said data replaced with said data-writing data, while executing error correction if that compared data is judged as data not replaced with said data-writing data, which is indicative of an error being generated in said management data; and management means for managing said tracking control of said recording medium according to the outputted equal data and for managing data-writing to said recording medium according to the outputted data-writing management data.

2. A method of recording for a write once-type recording medium having a guide groove, comprising the steps of:

reproducing from said recording medium, by tracking control, management data stored in said guide groove, said management data being composed of a series of track-position management data including frame numbers of said recording medium and data-writing management data, said track-position management data and said data-writing management data being super-imposed on each other in a way that said tracking-position management data are replaced with said data-writing management data per specific frame number;

comparing, per frame number, said management data with a series of reference track-position management data having said same number of data as the number of said management data;

outputting, if data of said track-position management data on a frame number is equal to data of said reference track-position management data on that frame number, that equal data, and if those compared data are not equal to each other, judging whether that compared data of said track-position management data is data which is replaced with said data-writing management data, then outputting said data-writing management data if that compared data is judged as the data replaced with said data-writing management data, while executing error correction if that compared data is judged as data not replaced with the data-writing management data, which is indicative of an error being generated in said management data; and managing said tracking control of said recording medium according to the outputted equal data and for managing data-writing to said recording medium according to the outputted data-writing management data.

3. A write once-type recording medium having a guide groove comprising:

first management data, having a plurality of management data components which regularly vary at a constant time cycle, for constantly managing positions of a track in said guide groove while data-writing/reading is executed; and second management data for managing said data-writing, wherein both said first and second management data are optically recorded on places in said guide groove, where the places are displaced from said track, and both said first and second management data are superimposed on each other in a way that specific components of said management data components of said first management data are repeatedly replaced with said second management data at a longer time cycle than the constant time cycle.

* * * * *